United States Patent
Chen et al.

(10) Patent No.: US 6,510,186 B1
(45) Date of Patent: Jan. 21, 2003

(54) SIGNAL TIME OF ARRIVAL ESTIMATION METHOD AND SYSTEM

(75) Inventors: Xixian Chen, Nepean (CA); Song Zhang, Nepean (CA); Shiquan Wu, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/321,818

(22) Filed: May 28, 1999

(51) Int. Cl.⁷ ............................ H04L 27/06; H04Q 7/20
(52) U.S. Cl. ........................... 375/343; 455/456
(58) Field of Search ........................... 375/343, 350, 375/316; 455/456, 422, 424, 440, 67.1; 342/457, 450, 463, 464, 465, 357

(56) References Cited

U.S. PATENT DOCUMENTS

| | | |
|---|---|---|
| 5,121,325 A | 6/1992 | DeJonge |
| 5,570,100 A | 10/1996 | Grube et al. |
| 5,726,742 A | 3/1998 | Nourrcier |
| 5,822,359 A * | 10/1998 | Bruckert et al. ............ 370/209 |
| 5,917,829 A * | 6/1999 | Hertz et al. ................. 370/479 |
| 6,031,882 A * | 2/2000 | Enge et al. ................. 375/343 |
| 6,121,927 A * | 9/2000 | Kalliojarvi ................. 342/453 |
| 6,219,334 B1 * | 4/2001 | Sato et al. .................. 370/210 |
| 6,330,452 B1 * | 12/2001 | Fattouche et al. .......... 342/457 |

* cited by examiner

*Primary Examiner*—Chi Pham
*Assistant Examiner*—Khai Tran

(57) ABSTRACT

A time delay estimation method including the steps of first, estimating a channel response from a received signal, and second, determining a time delay estimate by correlating the estimated channel response with an ideal channel response.

Further, a system including a channel estimator and a correlator is provided. The channel estimator is used for estimating a channel response from a received signal and the correlator is used for estimating a time delay using the channel response and an ideal channel response.

25 Claims, 4 Drawing Sheets

SIGNAL TIME OF ARRIVAL ESTIMATION METHOD AND SYSTEM

FIELD OF THE INVENTION

The invention relates generally to signal propagation delay estimation, and more particularly to signal propagation delay estimation using time domain techniques.

BACKGROUND OF THE INVENTION

Emergency 911 service is rapidly becoming essential in today's society. One of the compelling reasons for using the existing landline emergency 911 system is the ability to trace the caller's location. Using databases in the telephone network switches, the caller's location is determined and made available to the emergency services. In the event the caller is unable to inform the operator of their location, the ability to trace the call is invaluable.

The explosive growth of mobile phones, however, causes complications for emergency 911 services. While mobile users may call the 911 operator just as they would use a landline phone, there is no ability to trace the exact location of the mobile caller. The emergency 911 operator currently can only trace the mobile call to the base station closest to the mobile caller is using.

Mobile systems with the ability to locate mobile callers are known as wireless enhanced 911 or E911 systems. One known approach to determine a mobile caller's location involves using an improved handset. The improved handset may incorporate a global positioning systems (GPS) receiver to determine the mobile caller's location and then transmit the location to the emergency 911 operator. Another improved handset may use signals from multiple base stations to determine the mobile caller's location. These handset improvements, however, involve improved handset circuitry that increases the cost of the handsets. Further, the extra circuitry requires extra battery power. Moreover, deployment of the improvement takes time since it depends on the users upgrading their handsets.

Another approach would not modify the handsets, thereby avoiding the problems stated above. The so-called network approach involves modifying the base stations. One such approach involves angle of arrival techniques using improved antenna arrays at the base station. Another approach uses a rough idea of the mobile's transmission characteristics and compares these to a large database of the surrounding environment to determine a rough idea of the mobile's location. In the first approach, however, new antennas must be installed which may be expensive. In the second approach, maintaining the database is difficult since the environment changes readily.

There is, however, a network based approach that involves a minimum amount of hardware upgrade and does not require knowledge of the surrounding environment. The approach is known as Time Difference Of Arrival or TDOA. One method of TDOA involves measuring the Time Of Arrivals (TOA) of the mobile's signals at multiple base stations. The TOAs are then sent to the Central Office and subtracted to get the measurements of TDOA between base stations. These TDOA parameters are then used to locate the mobile's position using standard hyperbolic locating techniques.

In known TDOA systems computing the TOA is computationally intensive. To determine a TOA, all base stations must determine the time the same portion of the mobile's signal is received. Although most of the mobile's transmission is unknown conversation, the code sequence (shortened burst) used to set up the call is known. Therefore, the base station determines when the call set-up code is received by correlating the received signal with a stored version of the call set-up code. This computation is intensive, and usually requires hardware upgrades in the base station. Furthermore, if the TDOA computation was performed in the Central Office, the links between the base stations usually have to be upgraded for increased bandwidth.

Clearly, there is a need to estimate the Time Of Arrival for mobile signals using a minimum amount of computations and thus minimize the hardware upgrades required for networks implementing enhanced 911.

SUMMARY OF THE INVENTION

The invention is directed to a method and apparatus for estimating the time of arrival of a received signal with a reduced amount of computations.

According to one aspect of the present invention, there is provided a time delay estimation method. The method comprises the steps of: (a) estimating a channel response from a received signal, wherein the channel response is estimated from a framed signal according to the formula: $G=A^+X$, where G=the estimated even or odd channel response vector, $A^+=(A^HA)^{-1}A^H$, a pseudoinverse of A (the transmitted data matrix), X=the framed even or odd signal vector; and (b) determining a time delay estimate by correcting the estimated channel response with an ideal channel response.

According to another aspect of the present invention, there is provided an intra-symbol delay estimation method. The method comprises the steps of: (a) estimating a channel response from a received signal, wherein the channel response is estimated from a framed signal according to the formula: $G=A^+X$, where G=the estimated even or odd channel response vector, $A^+=(A^HA)^{-1}A^H$, a pseudoinverse of A (the transmitted data matrix), X=the framed even or odd signal vector; and (b) determining an intra-symbol delay estimate by correlating the estimated channel response with an ideal channel response.

According to another aspect of the present invention, there is provided an intra-symbol delay estimation method. The method comprises the steps of: (a) estimating a channel response from a received signal; and (b) determining an intra-symbol delay estimate by correlating the estimated channel response with an ideal channel response; the step (b) comprising steps of: (i) partitioning the ideal channel response into a plurality of interleaved subsets, with each subset containing half symbol interval spaced samples and having different timing phase, which is indicated by subset index; (ii) determining a correlation result for each subset by correlating each subset with the estimated channel response; and (iii) determining the intra-symbol delay estimate by selecting the highest correlation result.

According to another aspect of the present invention, there is provided a time of arrival estimation method. The method comprises the steps of: (a) matched filtering an input signal to produce a matched filtered signal; (b) buffering the matched filtered signal and adding global positioning system time stamps to produce a buffered signal; (c) compensating for a carrier frequency offset in the buffered signal to produce a received signal; (d) determining the start of a shortened burst signal in the received signal using a framer; (e) from the start of the shortened burst, checking the GPS time and determining an inter-symbol delay; (f) estimating a channel response from the shortened burst; (g) determining an intra-symbol delay estimate by correlating the estimated channel response with an ideal channel response; and (h) determining a time of arrival signal by adding the inter-symbol delay and the intra-symbol delay.

According to another aspect of the present invention, there is provided a system, which comprises: (a) a channel estimator for estimating a channel response from a received signal, the channel estimator being adapted to estimate the channel response from a framed signal according to a formula: $G=A^+X$, where $G=$the estimated even or odd channel response vector, $A^+=(A^HA)^{-1}A^H$, a pseudoinverse of A (the transmitted data matrix), $X=$the framed even or odd signal vector; and (b) a correlator for estimating a time delay using the channel response and an ideal channel response.

An advantage of the invention is reduced computational requirements due to using the estimated channel response rather than the received signal in the correlation operation. The reduction in computations reduces the cost and complexity of determining the time delay estimate.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

First, a general overview of various embodiments of the invention is provided. Generally speaking, one way to locate a wireless communications device, such as a mobile phone, is to do a time difference of arrival (TDOA) estimation and use triangulation to estimate the mobile's location. The TDOA estimate is preferably obtained by estimating the time of arrival (TOA) of the mobile's signal at each radio receiver and then subtracting one TOA from another to get an estimate of a TDOA. TOA estimates are basically the signal propagation times from the mobile to the involved base stations, which are synchronized in time. TDOA estimates are the differences in these signal propagation times between base stations.

Various embodiments of the invention, in general, use both the received signal and a known transmitted reference signal to estimate a baseband channel response and apply auto-correlation on the estimated channel response with an ideal channel response to determine a TOA estimate.

Again, generally speaking, various embodiments of the invention function are as follows. A signal from a mobile phone, or other like wireless device, is received at each receiver, preferably at each base station. The received signal is down-converted to a baseband signal. The baseband signal is then sampled twice per symbol interval by the synchronized analogue-to-digital (A/D) converter and buffered with inserted Global Positioning System time stamps. A framer uses the sync word to determine the signal burst boundary. Once the sampled sequence is acquired by the framer, the sampled sequence is used along with a known transmit sequence to estimate the equivalent baseband channel response. The equivalent baseband channel response includes the transmit filter, the physical channel and the receive filter. The estimated channel response is then correlated with an ideal channel response to give the intra-symbol delay. The ideal channel response includes the transmit filter and the receive filter with zero delay. The intra-symbol delay is combined with the inter-symbol delay determined by the framer to estimate the TOA. The TOA estimations from difference receivers are sent to a central place, usually a Central Office, where the TDOA estimations are determined from the TOA estimations. The TDOA estimations are used to determine the location of the mobile phone.

This concludes the general overview of various embodiments of the invention. Secondly, a detailed description of the structure of various embodiments of the invention is provided.

Figure 1:
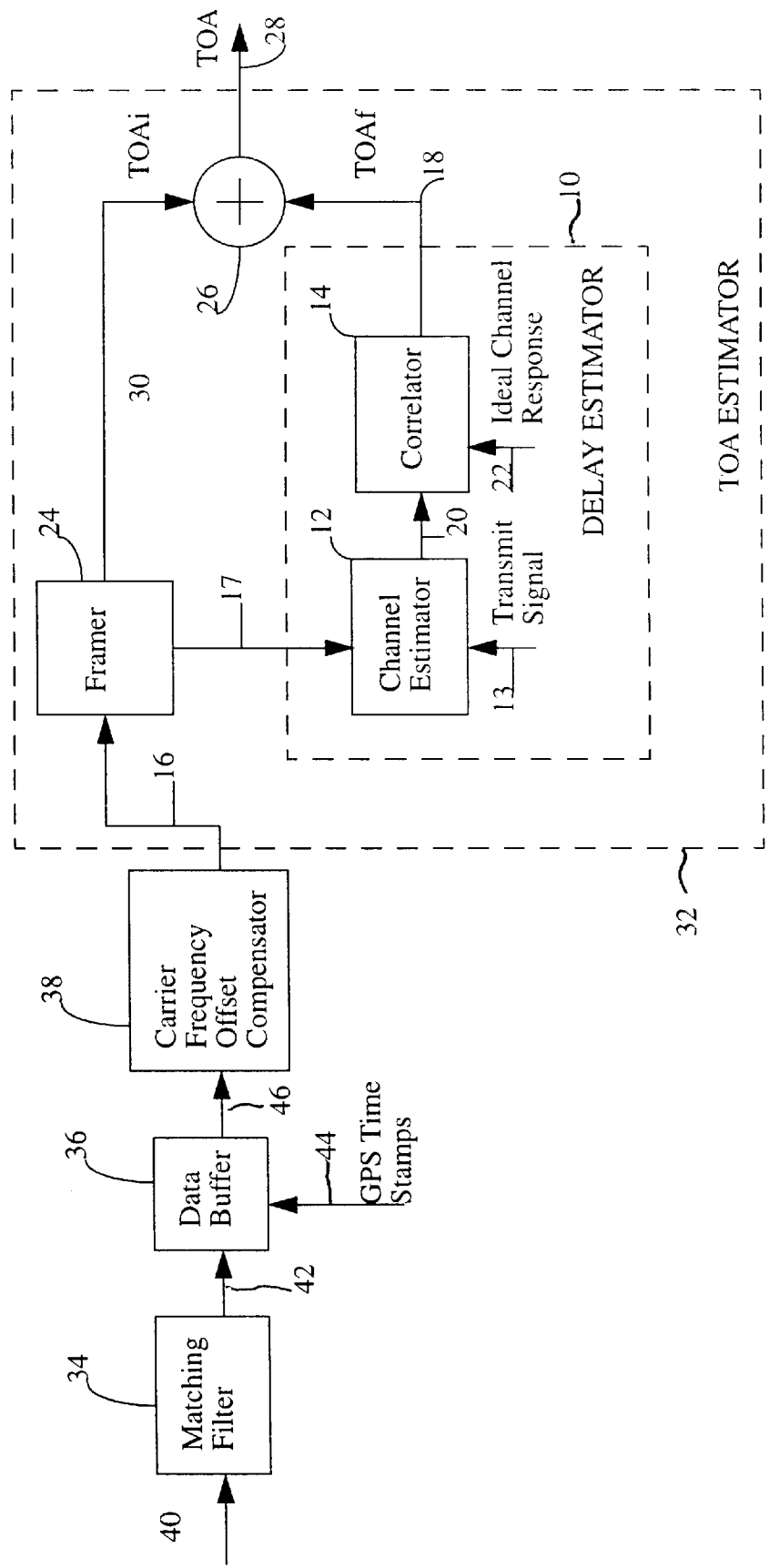
FIG. 1 is a system block diagram of an embodiment of the invention.

FIG. 1 illustrates a system block diagram of an embodiment of the invention. The system includes a delay estimator 10 that includes a channel estimator 12 and a correlator 14. The channel estimator 12 estimates a channel response from a framed signal 17. Preferably, the channel estimator 12 also uses a transmit signal 13. The correlator 14 estimates a time delay, preferably an intra-symbol delay 18, using the estimated channel response 20 and an ideal channel response 22.

Preferably, the delay estimator 10 is used with a framer 24 and a summer 26 to produce a TOA estimate 28. The framer 24 estimates the inter-symbol delay 30 using the received signal 16 and outputs the framed signal 17. The summer 26 combines the inter-symbol-delay 30 and the intra-symbol delay 18 to produce the TOA estimate 28. Collectively, the delay estimator 10, the framer 24 and the summer 26 form a TOA estimator 32.

Preferably, the TOA estimator 32 is used with a matched filter 34, a data buffer 36 and a carrier frequency offset compensator 38. The matched filter 34 matched filters an input signal 40 to produce a filtered signal 42. The data buffer 36 buffers the filtered signal 42 and adds a global positioning system time stamp 44 to the filtered signal 42 to produce a buffered signal 46. The carrier frequency offset compensator 38 compensates for carrier offset in the buffered signal 46 to produce the received signal 16. Taken together, the matched filter 34, the data buffer 36, the carrier frequency offset compensator 38 and the TOA estimator 32 form a part of a base station.

This concludes the detailed description of the structure of various embodiments of the invention. Thirdly, a detailed description of the operation of various embodiments of the invention is provided.

Figure 2:
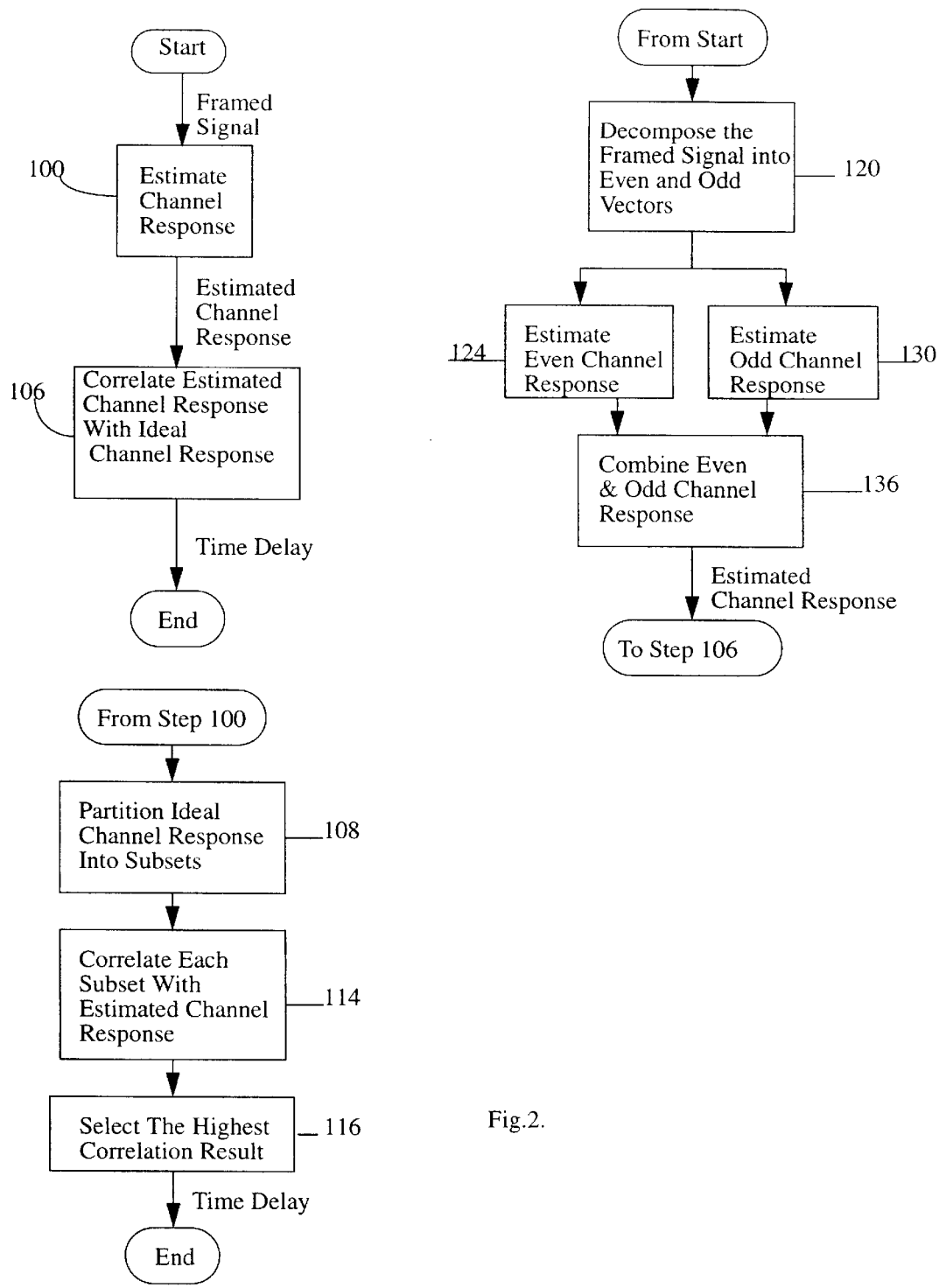
FIG. 2 is a flowchart illustrating a time delay estimation method according to an embodiment of the invention.

FIG. 2 is a flowchart illustrating a time delay estimation method according to an embodiment of the invention. The time delay estimation method includes the following steps:

Estimate a channel response from the framed signal (step 100). Step 100 may also include the following steps:

Decompose the framed signal into an even and odd vectors (step 120).

Estimate an even channel response from the even vector (step 124). Preferably, the channel response is estimated according to $G_E=A^+X_E$, where $G_E=$The Estimated Even Channel Response Vector, $A^+=$ $(A^H A)^{-1} A^H$, the pseudoinverse of A (the Transmitted Data Matrix), $X_E$=The Even Signal Vector (step 126). Also preferably, the pseudoinverse of A is computed and stored before the channel response is estimated (step 128).

Estimate an odd channel response from the odd vector (step 130). Preferably, the channel response is estimated according to $G_O = A^+ X_O$, where $G_O$=The Estimated Odd Channel Response Vector, $A^+ = (A^H A)^{-1} A^H$, the pseudoinverse of A (the Transmitted Data Matrix), $X_O$=The Odd Signal Vector (step 132). Also preferably, the pseudoinverse of A is computed and stored before the channel response is estimated (step 134).

Determining the estimated channel response by combining the even channel response estimate and the odd channel response estimate (step 136).

Determine a time delay estimate by correlating the estimated channel response with an ideal channel response (step 106). Step 106 may also include the following steps:

Partition the ideal high-resolution (with sampling rate being T/800, where T is the data symbol period) channel response into a plurality of interleaved subsets, with each subset containing half symbol interval spaced samples. Each subset has different timing phase, which is indicated by subset index (step 108). After partitioning the subsets, the subsets may be stored (step 110). Further, the ideal channel response may be a raised cosine waveform (step 113).

Determine a correlation result for each subset by correlating each subset with the estimated channel response (step 114).

Determine the time delay estimate by selecting the subset index having the highest correlation result (step 116).

Figure 3:
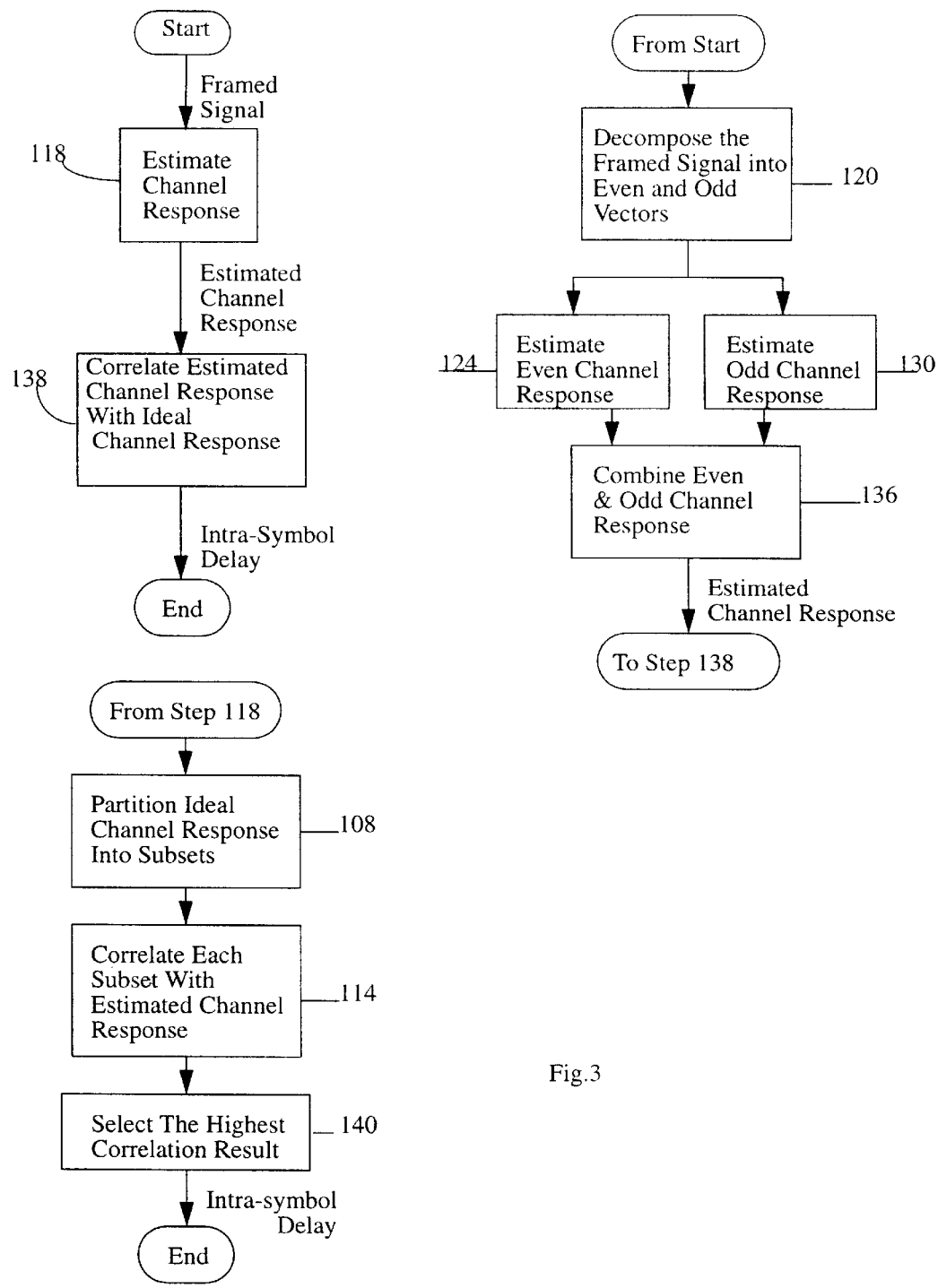
FIG. 3 is a flowchart illustrating an intra-symbol delay estimation method according to an embodiment of the invention.

FIG. 3 is a flowchart illustrating an intra-symbol delay estimation method according to an embodiment of the invention. The intra-symbol delay estimation method includes the following steps:

Estimate a channel response from the framed signal (step 118). Step 118 may also include the following steps:

Decompose the framed signal into an even and odd vectors (step 120).

Estimate an even channel response from the even vector (step 124). Preferably, the channel response is estimated according to $G_E = A^+ X_E$, where $G_E$=The Estimated Even Channel Response Vector, $A^+ = (A^H A)^{-1} A^H$, the pseudoinverse of A (the Transmitted Data Matrix), $X_E$=The Even Signal Vector (step 126). Also preferably, the pseudoinverse of A is computed and stored before the channel response is estimated (step 128).

Estimate an odd channel response from the odd vector (step 130). Preferably, the channel response is estimated according to $G_O = A^+ X_O$, where $G_O$=The Estimated Odd Channel Response Vector, $A^+ = (A^H A)^{-1} A^A$, the pseudoinverse of A (the Transmitted Data Matrix), $X_O$=The Odd Signal Vector (step 132). Also preferably, the pseudoinverse of A is computed and stored before the channel response is estimated (step 134).

Determining the estimated channel response by combining the even channel response estimate and the odd channel response estimate (step 136).

Determine an intra-symbol delay estimate by correlating the estimated channel response with an ideal channel response (step 138). Step 138 may also include the following steps:

Partition the ideal high-resolution (with sampling rate being T/800, where T is the data symbol period) channel response into a plurality of interleaved subsets, with each subset containing half symbol interval spaced samples. Each subset has different timing phase, which is indicated by subset index (step 108). After partitioning the subsets, the subsets may be stored (step 110). Further, the ideal channel response may be a raised cosine waveform (step 113).

Determine a correlation result for each subset by correlating each subset with the estimated channel response (step 114).

Determine the intra-symbol estimate by selecting the subset index having the highest correlation result (step 140).

Figure 4:
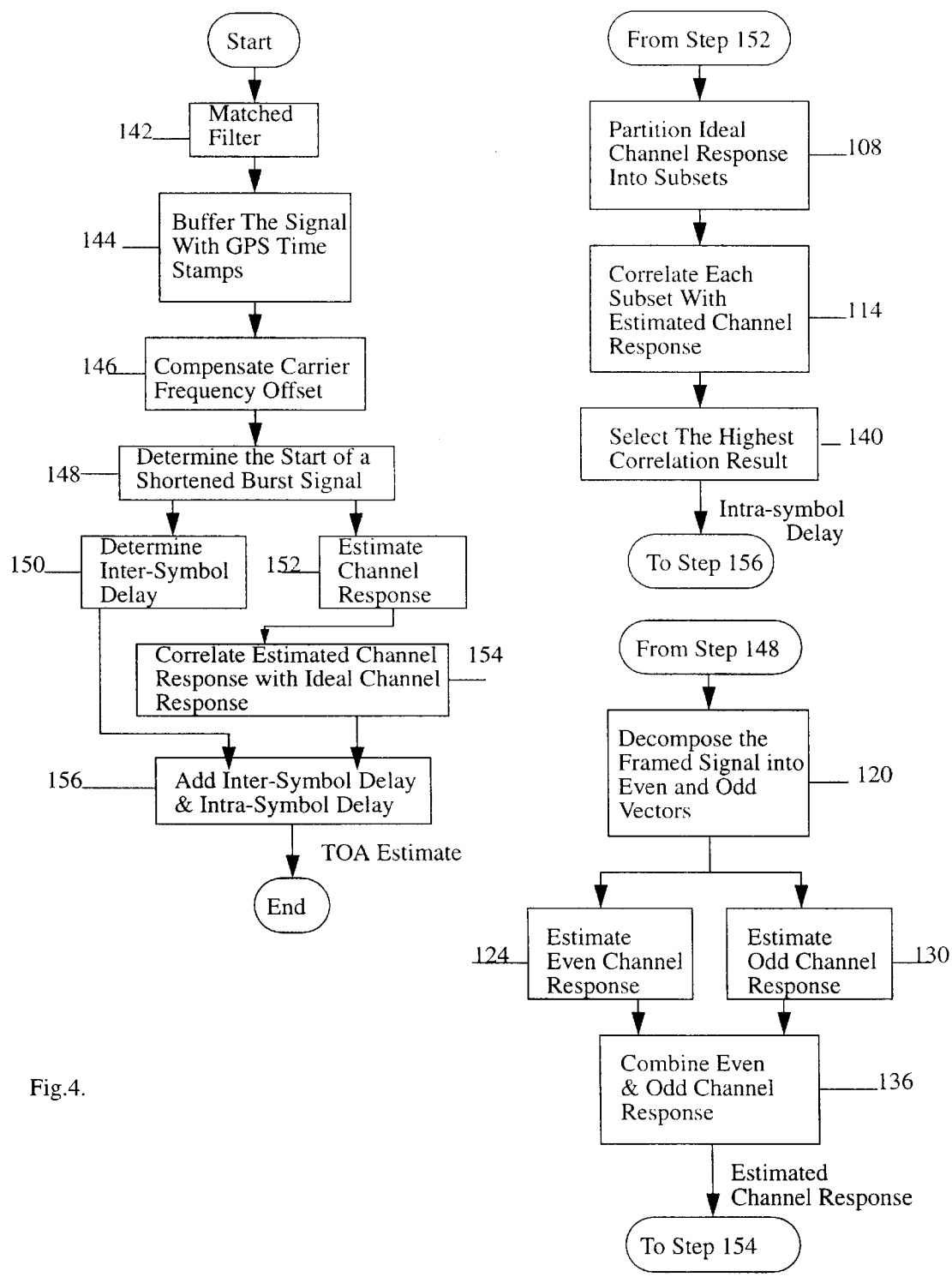
FIG. 4 is a flowchart illustrating a time of arrival estimation method according to an embodiment of the invention.

FIG. 4 is a flowchart illustrating a time of arrival estimation method according to an embodiment of the invention. The time of arrival estimation method includes the following steps:

Matched filter the input signal to produce a matched filtered signal (step 142).

Buffer the matched filtered signal and adding global positioning system time stamps to produce a buffered signal (step 144).

Compensate for the carrier offset in the buffered signal to produce a received signal (step 146).

Determine the start of a shortened burst signal in the received signal using a framer (step 148).

From the start of the shortened burst, check the GPS time and determine the inter-symbol delay (step 150).

Estimate a channel response from the shortened burst (step 152). Step 152 may also include the following steps:

Decompose the framed signal into an even and odd vectors (step 120).

Estimate an even channel response from the even vector (step 124). Preferably, the channel response is estimated according to $G_E = A^+ X_E$, where $G_E$=The Estimated Even Channel Response Vector, $A^+ = (A^H A)^{-1} A^H$, the pseudoinverse of A (the Transmitted Data Matrix), $X_E$=The Even Signal Vector (step 126). Also preferably, the pseudoinverse of A is computed and stored before the channel response is estimated (step 128).

Estimate an odd channel response from the odd vector (step 130). Preferably, the channel response is estimated according to $G_O = A^+ X_O$, where $G_O$=The Estimated Odd Channel Response Vector, $A^+ = (A^H A)^{-1} A^H$, the pseudoinverse of A (the Transmitted Data Matrix), $X_O$=The Odd Signal Vector (step 132). Also preferably, the pseudoinverse of A is computed and stored before the channel response is estimated (step 134).

Determine the estimated channel response by combining the even channel response estimate and the odd channel response estimate (step 136).

Determine an intra-symbol delay estimate by correlating the estimated channel response with an ideal channel response (step 154). Step 154 may also include the following steps:

Partition the ideal high-resolution (with sampling rate being T/800, where T is the data symbol period) channel response into a plurality of interleaved subsets, with each subset containing half symbol interval spaced samples. Each subset has different timing phase, which is indicated by subset index (step 108). After partitioning the subsets, the subsets may be stored (step 110). Further, the ideal channel response may be a raised cosine waveform (step 113).

Determine a correlation result for each subset by correlating each subset with the estimated channel response (step 114).

Determine the intra-symbol estimate by selecting the subset index having the highest correlation result (step 140).

Determining a time of arrival by adding the inter-symbol delay and the intra-symbol delay (step 156).

This concludes the detailed description of the operation of various embodiments of the invention. Fourthly, a detailed description of the advantages of various embodiments of the invention is provided.

Traditionally, auto-correlation for TOA estimates applies auto-correlation directly on the received signal with the known transmitted signal as the reference. To achieve better performance of fine TOA resolution, a long signal with a high sampling rate is normally used, which, for traditional auto-correlation, makes the system very computing intensive and sometimes impossible to implement.

As outlined in the Background section, in general, there are two approaches to do TDOA estimation. One is to use cross-correlation on two received signals from two different radios to directly estimate TDOA. The other is to use auto-correlation on the received signal with the known transmitted signal as the reference to estimate TOA in each radio locally and subtract one TOA from the other to get TDOA. Traditionally, auto-correlation, and traditional cross-correlation, needs two received signals to be long and highly over sampled, which causes the high computing complexity in order to have good performance of fine TDOA resolution. Also, cross-correlation requires a high-speed data link between the radios and the central cross-correlator to have the over-sampled signals sent over, which further increases the system complexity and cost.

The various embodiments of the invention use two samples per symbol period to do least squares based channel estimation, and auto-correlation is done on the estimated channel response which has much shorter time duration than that of the original signal burst. The various embodiments of the invention achieve high computing efficiency without compromising performance. This leads to easier implementation.

Location determination based on TOA estimation techniques may also offer the following advantages in addition to E911:

child tracking criminal tracking roadside assistance vehicle fleet management, for example, rental and truck companies direction finding traffic information location based billing or advertisements While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A time delay estimation method comprising the steps of:

(a) estimating a channel response from a received signal, wherein the channel response is estimated from a framed signal according to the formula: $G=A^+X$, where $G$=the estimated even or odd channel response vector, $A^+=(A^HA)^{-1}A^H$, a pseudoinverse of A (the transmitted data matrix), $X$=the framed even or odd signal vector; and (b) determining a time delay estimate by correcting the estimated channel response with an ideal channel response.

2. The method recited in claim 1 further comprising the step of, before the step (a), computing and storing the pseudoinverse of A.

3. The method recited in claim 1 wherein the step (b) comprises the steps of:

(c) partitioning the ideal channel response into a plurality of interleaved subsets, with each subset containing half symbol interval spaced samples and having different timing phase, which is indicated by subset index;

(d) determining a correlation result for each subset by correlating each subset with the estimated channel response; and (e) determining the time delay estimate by selecting the highest correlation result.

4. The method recited in claim 3 further comprising the step of, after the step (c), storing the subsets.

5. The method recited in claim 3 wherein, the ideal channel response is substantially equal to a raised cosine waveform.

6. An intra-symbol delay estimation method comprising the steps of:

(a) estimating a channel response from a received signal, wherein the channel response is estimated from a framed signal according to the formula: $G=A^+X$, where $G$=the estimated even or odd channel response vector, $A^+=(A^HA)^{-1}A^H$, a pseudoinverse of A (the transmitted data matrix), $X$=the framed even or odd signal vector; and (b) determining an intra-symbol delay estimate by correlating the estimated channel response with an ideal channel response.

7. An intra-symbol delay estimation method comprising the steps of:

(a) estimating a channel response from a received signal; and (b) determining an intra-symbol delay estimate by correlating the estimated channel response with an ideal channel response; the step (b) comprising steps of:

(i) partitioning the ideal channel response into a plurality of interleaved subsets, with each subset containing half symbol interval spaced samples and having different timing phase, which is indicated by subset index;

(ii) determining a correlation result for each subset by correlating each subset with the estimated channel response; and (iii) determining the intra-symbol delay estimate by selecting the highest correlation result.

8. The method recited in claim 7 further comprising the step of, after the step (i), storing the subsets.

9. The method recited in claim 7 wherein, in the step (i), the ideal channel response is substantially equal to a raised cosine waveform.

10. The method recited in claim 7 wherein the step (a) comprises the steps of:
   (i) decomposing the received signal into an even and odd vector;
   (ii) estimating an even channel response of the even vector;
   (iii) estimating an odd channel response of the odd vector; and
   (iv) determining the estimated channel response by combining the even channel response estimate and the odd channel response estimate.

11. The method as recited in claim 10 wherein the substep (ii) of the step (a) comprises the step of estimating the even channel response from the even vector according to the formula: $G_E = A^+ X_E$, where $G_E$=The Estimated Even Channel Response Vector, $A^+ = (A^H A)^{-1} A^H$, a pseudoinverse of A (the Transmitted Data Matrix), $X_E$=The Even Signal Vector.

12. The method as recited in claim 11 further comprising the steps of, before the step (a), computing and storing the pseudoinverse of A.

13. The method as recited in claim 10 wherein the substep (iii) of the step (a) comprises the step of estimating the odd channel response from the odd vector according to the formula: $G_O = A^+ X_O$, where $G_O$=The Estimated Odd Channel Response Vector, $A^+ = (A^H A)^{-1} A^H$, a pseudoinverse of A (the Transmitted Data Matrix), $X_O$=The Odd Signal Vector.

14. The method as recited in claim 13 further comprising the steps of, before the step (a), computing and storing the pseudoinverse of A.

15. A time of arrival estimation method comprising the steps of:
   (a) matched filtering an input signal to produce a matched filtered signal;
   (b) buffering the matched filtered signal and adding global positioning system time stamps to produce a buffered signal;
   (c) compensating for a carrier frequency offset in the buffered signal to produce a received signal;
   (d) determining the start of a shortened burst signal in the received signal using a framer;
   (e) from the start of the shortened burst, checking the GPS time and determining an inter-symbol delay;
   (f) estimating a channel response from the shortened burst;
   (g) determining an intra-symbol delay estimate by correlating the estimated channel response with an ideal channel response; and
   (h) determining a time of arrival signal by adding the inter-symbol delay and the intra-symbol delay.

16. The method recited in claim 15 wherein step (h) further comprises the steps of:
   (i) partitioning the ideal channel response into a plurality of subset, with each subset containing half symbol interval spaced samples and having different timing phase, which is indicated by subset index;
   (ii) determining a correlation result for each subset by correlating each subset with the estimated channel response; and
   (iii) determining the intra-symbol delay estimate by selecting the highest correlation result.

17. The method recited in claim 16 further comprising the step of, after the step (i), storing the subsets.

18. The method recited in claim 16 wherein, in the step (i), the ideal channel response is substantially equal to a raised cosine waveform.

19. The method recited in claim 15 wherein the step (g) comprises the steps of:
   (i) decomposing the received signal into an even and odd vector;
   (ii) estimating the even channel response from the even vector according to the formula: $G_E = A^+ X_E$, where $G_E$=The Estimated Even Channel Response Vector, $A^+ = (A^H A)^{-1} A^H$, a pseudoinverse of A (the Transmitted Data Matrix), $X_E$=The Even Signal Vector.
   (iii) estimating the odd channel response from the odd vector according to the formula: $G_O = A^+ X_O$, where $G_O$=The Estimated Odd Channel Response Vector, $A^+ = (A^H A)^{-1} A^H$, a pseudoinverse of A (the Transmitted Data Matrix), $X_O$=The Odd Signal Vector.
   (iv) determining the estimated channel response by combing the even channel response estimate and the odd channel response estimate.

20. The method as recited in claim 19 further comprising the steps of, before the steps (ii) and (iii), computing and storing the pseudoinverse of A.

21. A system comprising:
   (a) a channel estimator for estimating a channel response from a received signal, the channel estimator being adapted to estimate the channel response from a framed signal according to a formula: $G = A^+ X$, where G=the estimated even or odd channel response vector, $A^+ = (A^H A)^{-1} A^H$, a pseudoinverse of A (the transmitted data matrix), X=the framed even or odd signal vector; and
   (b) a correlator for estimating a time delay using the channel response and an ideal channel response.

22. The system recited in claim 21 wherein the time delay is an intra-symbol delay.

23. The system recited in claim 22 wherein the channel estimator uses the received signal and a transmitted reference signal to produce the channel estimate.

24. The system recited in claim 23 further comprising;
   (c) a framer for estimating an inter-symbol delay using the received signal, and
   (d) a summer for combining the inter-symbol-delay and the intra-symbol delay to produce a time of arrival estimate.

25. The system recited in claim 22 comprising;
   (e) a matched filter for matched filtering an input signal to produce a filtered signal;
   (f) a data filter for buffering the filtered signal and for adding a global positioning system time stamp to the filtered signal to produce a buffered signal; and
   (g) a carrier frequency offset compensator for compensating for carrier offset in the buffered signal to produce the received signal.

* * * * *